US011569704B2

(12) United States Patent  
Nam et al.

(10) Patent No.: US 11,569,704 B2  
(45) Date of Patent: Jan. 31, 2023

(54) IN-WHEEL MOTOR

(71) Applicant: LG ELECTRONICS, INC., Seoul (KR)

(72) Inventors: Jaekwang Nam, Seoul (KR); Hyoung Uk Nam, Seoul (KR); Jin Hong, Seong (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 16/881,342

(22) Filed: May 22, 2020

(65) Prior Publication Data

US 2020/0373806 A1  Nov. 26, 2020

(30) Foreign Application Priority Data

May 24, 2019 (KR) .................. 10-2019-0061510

(51) Int. Cl.
*H02K 5/10* (2006.01)
*B60B 7/00* (2006.01)
(Continued)

(52) U.S. Cl.
CPC .............. *H02K 5/10* (2013.01); *B60B 7/00* (2013.01); *B60B 7/14* (2013.01); *B60B 21/00* (2013.01);
(Continued)

(58) Field of Classification Search
CPC ... B60B 21/00; B60B 21/10; B60B 2900/112; B60B 2900/212; B60B 2900/325;
(Continued)

(56) References Cited

U.S. PATENT DOCUMENTS

2006/0025268 A1  2/2006  Chang et al.
2007/0257570 A1*  11/2007  Walter ................. B60K 7/0007
310/67 R
(Continued)

FOREIGN PATENT DOCUMENTS

CN  201813252 U  4/2011
CN  202319875 U  7/2012
(Continued)

*Primary Examiner* — Naishadh N Desai
(74) *Attorney, Agent, or Firm* — Dentons US LLP

(57) ABSTRACT

The present invention relates to an in-wheel motor. The in-wheel motor according to an embodiment of the present invention includes: a circular rim to which a tire is coupled by being wrapped around an outer ring thereof and a shaft is connected by passing through a center thereof; a motor assembly which is disposed in an inner portion of the rim and includes a stator connected to the shaft and a rotor disposed to be wrapped around the stator and configured to rotate; a cover coupled to cover one open side surface of the rim and configured to seal the inner portion of the rim; and a lead-out wire entry/exit portion waterproof structure configured to seal an entry/exit portion for a lead-out wire connected to supply power from outside of the in-wheel motor to the inner portion of the rim via a hollow portion of the shaft, wherein the lead-out wire entry/exit portion waterproof structure includes an elastic stopper, to which the lead-out wire is connected to pass through a center thereof and which is configured to be elastically contracted after being inserted into the hollow portion of the shaft in an axial direction and seal between the hollow portion of the shaft and the lead-out wire, and a stopper fixing body fastened to the shaft and configured to press the elastic stopper in the axial direction so that the elastic stopper is inserted and fixed inside the hollow portion of the shaft.

18 Claims, 10 Drawing Sheets

(51) Int. Cl.
  *B60B 7/14* (2006.01)
  *B60B 21/00* (2006.01)
  *B60B 21/10* (2006.01)
  *B60K 7/00* (2006.01)
  *H02K 3/50* (2006.01)
  *H02K 7/00* (2006.01)
  *H02K 21/22* (2006.01)

(52) U.S. Cl.
  CPC ............ *B60B 21/10* (2013.01); *B60K 7/0007* (2013.01); *H02K 3/50* (2013.01); *H02K 7/003* (2013.01); *H02K 7/006* (2013.01); *H02K 21/22* (2013.01); *B60B 2900/112* (2013.01); *B60B 2900/212* (2013.01); *B60B 2900/325* (2013.01); *B60B 2900/511* (2013.01); *B60K 2007/0092* (2013.01); *H02K 2203/06* (2013.01)

(58) Field of Classification Search
  CPC ....... B60B 2900/511; B60B 7/00; B60B 7/14; B60K 2007/0038; B60K 2007/0092; B60K 7/0007; H02K 1/2786; H02K 21/22; H02K 2203/06; H02K 3/50; H02K 5/10; H02K 5/124; H02K 5/1732; H02K 7/003; H02K 7/006; H02K 7/1846; Y02T 10/64
  See application file for complete search history.

(56) References Cited

U.S. PATENT DOCUMENTS

| | | |
|---|---|---|
| 2010/0163323 A1 | 7/2010 | Pickholz |
| 2010/0300782 A1* | 12/2010 | Walter ................. B60K 17/046 475/149 |
| 2014/0183930 A1 | 7/2014 | Wei et al. |
| 2017/0110933 A1* | 4/2017 | Michel ................. B60L 3/0061 |

FOREIGN PATENT DOCUMENTS

| | | | | |
|---|---|---|---|---|
| CN | 103129372 A | | 6/2013 | |
| CN | 204376671 U | | 6/2015 | |
| DE | 10338659 A1 | | 3/2005 | |
| EP | 0937585 B1 | | 2/1999 | |
| EP | 1380459 A1 | * | 1/2004 | ............... B60G 3/20 |
| JP | 3097068 U | | 1/2004 | |
| JP | 2005045904 A | | 2/2005 | |
| JP | 2005329767 A | * | 12/2005 | |
| JP | 2017 501081 A | | 1/2017 | |
| JP | 2017519680 A | | 7/2017 | |
| KR | 10-1999-0031188 A | | 5/1999 | |
| KR | 20-1999-0041210 U | | 12/1999 | |
| KR | 20-2010-0008906 A1 | | 9/2010 | |
| KR | 10-2013-0033087 A | | 4/2013 | |
| KR | 10-2015-0143291 A | | 12/2015 | |
| KR | 10-2017-0027364 A | | 3/2017 | |
| WO | 2013141427 A1 | | 9/2013 | |

* cited by examiner (PRIOR ART)

IN-WHEEL MOTOR

CROSS-REFERENCE TO RELATED APPLICATION

This application claims priority to and the benefit of Korean Patent Application No. 10-2019-0061510, filed on May 24, 2019, the disclosure of which is incorporated herein by reference in its entirety.

BACKGROUND

1. Field of the Invention

The present invention relates to an in-wheel motor having a waterproof structure.

2. Discussion of Related Art

An in-wheel motor is used in a moving means that uses electricity as a power source.

Power is output from a motor assembly disposed at an inner portion of a rim of the in-wheel motor.

The motor assembly includes a stator and a rotor. The power generated from the motor assembly is directly transmitted to a wheel of the in-wheel motor without using a separate power transmission device.

Accordingly, the wheel wound around the rim of the in-wheel motor rotates using electricity as a power source.

In this way, due to not requiring a complex driving device or power transmission device unlike conventional moving means, the in-wheel motor has a relatively simple structure.

As a result, the in-wheel motor has advantages in that it makes it possible to reduce the weight of a moving means and is able to reduce energy loss that occurs during power transmission.

The in-wheel motor includes a tire, the rim, the motor assembly, and a shaft.

In brief, the tire is wrapped around and coupled to the rim. The motor assembly includes the stator and the rotor and is disposed at an inner side of the rim. The shaft is connected to pass through the center of the stator.

The stator of the in-wheel motor receives power via a power supply lead-out wire.

The power supply lead-out wire is connected to the stator via a hollow of the shaft. When power is supplied to the stator via the power supply lead-out wire, the rotor rotates about the stator.

Because the rotor is connected to the rim, the rim rotates when the rotor rotates. Also, the tire coupled to an outer ring of the rim rotates.

In this way, because the motor assembly that operates by power supply is disposed at the inner side of the rim, the in-wheel motor requires securing a waterproof structure at a position where the power supply lead-out wire enters and exits.

In a conventional case, a task of sealing an entry/exit portion using a material such as silicone is performed at the position where the power supply lead-out wire enters and exits.

However, according to the conventional method, because the whole task of applying the material such as silicone on the entry/exit portion for the power supply lead-out wire is performed manually, there may be a difference in waterproof performance according to skill of one performing the task.

Further, according to the conventional method, because the material such as silicone is vulnerable to vibration, impact, and the like, there is a problem in that reliability of the waterproof structure is degraded.

Meanwhile, unlike the method of using the material such as silicone, conventionally, a tubular waterproof part, e.g., a cable gland, is purchased and used to secure a necessary waterproof structure.

However, because the price of the waterproof part such as a cable gland is very high, there is a problem in that applying the waterproof part to the in-wheel motor causes an increase in the overall unit cost of the in-wheel motor.

In this way, the in-wheel motor requires securing a waterproof structure for parts for which waterproofing is required, such as the motor assembly disposed at the inner portion of the rim, as well as securing a waterproof structure at the portion where the power supply lead-out wire enters and exits.

Also, because the in-wheel motor is used as a moving means, a diameter of the wheel or rim is an important issue. For this reason, it is important to design the in-wheel motor such that the diameter of the wheel or rim does not become unnecessarily large to secure the waterproof structure of the in-wheel motor.

Therefore, in securing the waterproof structure of the in-wheel motor, there is a need to develop a technology capable of improving reliability of waterproof performance, promoting cost reduction, and not requiring a change or an increase in the size of the shaft or rim.

As a related art, Korean Unexamined Patent Application Publication No. 10-2015-0143291 (hereinafter referred to as Related Art Document 1) discloses a waterproof seal structure of the motor lead line.

Referring to FIG. 1, the waterproof seal structure of the motor lead line that is disclosed in Related Art Document 1 has a configuration in which a first peeling section (11) and a second peeling section (21), which are disposed at sites at which a first lead line (1) and a second lead line (2) do not cross each other, are sealed by injecting an adhesive into the first peeling section (11) and the second peeling section (21).

In other words, the waterproof seal structure for the motor lead line, which is a structure in which the first peeling section (11) and the second peeling section (21) are sealed by an adhesive in a sealing cavity (3), has a waterproof function.

However, because the peeling sections are sealed using an adhesive, there is a disadvantage in that the sealing task is not performed with uniform quality, and, because the waterproof structure is vulnerable to vibration or impact, there is difficulty in improving the reliability of waterproof performance.

As another related art, Korean Unexamined Patent Application Publication No. 10-2013-0033087 (hereinafter referred to as Related Art Document 2) discloses a coupling structure of an in-wheel motor for a vehicle with a cable and a coupling method thereof.

In the coupling structure of the in-wheel motor and the cable that is disclosed in Related Art Document 2, an upper end of a cover of the cable is designed to be detachable, and the cover is assembled from top to bottom so that airtightness is increased by fastening a bolt.

However, because structures of a lower end and the upper end of the cover are changed to be complex, there is difficulty in securing the waterproof structure without changing the structure and size of the in-wheel motor.

As yet another related art, Korean Utility Model Publication No. 1999-0041210 (hereinafter referred to as Related Art Document 3) discloses a waterproof structure for a cable lead-out connection part of a submersible motor pump.

According to the waterproof structure disclosed in Related Art Document 3, a connecting portion of a submersible cable that is in a stripped state is inserted into an upper compression type rubber bush and fitted and pressed into one end of a closing sleeve. Also, a lead wire of a stator is cut to a predetermined length, inserted into a lower compression type rubber bush, and then fitted and pressed into the other end of the closing sleeve. Then, the upper compression type rubber bush and the lower compression type rubber bush are brought into close contact and tightened and compressed with a bolt to secure the waterproof structure between the cable and the lead wire of the stator.

However, the conventional waterproof device for the cable lead-out connection part, which has a structure applicable to waterproofing a joint of the cable led to the outside from the submersible motor pump, is significantly different from the waterproof structure of the in-wheel motor in terms of the target of application and the required waterproofing ability.

In other words, waterproof performance of the in-wheel motor is sufficient as long as it is possible to protect a portion where the power supply lead-out wire enters and exits and the elements of the in-wheel motor such as the motor assembly at the inner portion of the rim.

However, Related Art Document 3 is different in that a plurality of elements, such as the upper and lower compression type rubber bushes and the closing sleeve, are further used to secure waterproof performance for the cable joint portion under water.

Therefore, in applying the waterproof device for the cable lead-out connection part of the submersible motor pump that is disclosed in Related Art Document 3 to the waterproof structure of the in-wheel motor, there may be many difficulties in terms of structure and problems such as a cost increase.

RELATED ART DOCUMENT

Korean Utility Model Publication No. 1999-0041210

SUMMARY OF THE INVENTION

The present invention is directed to providing an in-wheel motor that is, in securing a waterproof structure at an entry/exit portion for a power supply lead-out wire of the in-wheel motor, capable of being manufactured with a low cost and formed of a structure robust to vibration and impact such that reliability is improved.

The present invention is directed to providing an in-wheel motor that is capable of securing a waterproof structure through a simple assembly process without structurally expanding, or changing the design of, a hollow portion of a shaft through which a power supply lead-out wire enters and exits.

The present invention is directed to providing an in-wheel motor that has improved product reliability regarding waterproofing by securing a waterproof structure at a portion where a power supply lead-out wire enters and exits and securing a waterproof structure relating to an inner portion of a rim in which a plurality of parts, such as a motor assembly, are embedded.

The present invention is directed to providing an in-wheel motor that is, in securing a waterproof structure relating to an inner portion of a rim, capable of improving waterproof performance without a change in a diameter of the in-wheel motor, which is used as a moving means, because increasing a diameter of the rim is not necessary.

The present invention is directed to providing an in-wheel motor that is capable of improving the structural rigidity of a rim itself while improving waterproof performance of the in-wheel motor and capable of improving convenience in a tire replacement task.

The objectives of the present invention are not limited to those mentioned above. Other unmentioned objectives of the present invention and advantages thereof should be understood from the following descriptions and more clearly understood from the embodiments of the present invention. Also, it should be apparent that the objectives and advantages of the present invention may be implemented by means and combinations thereof shown in the claims below.

To achieve one of the above objectives, one aspect of the present invention provides an in-wheel motor in which a waterproof structure is secured at an entry/exit portion for a power supply lead-out wire.

The in-wheel motor according to an embodiment of the present invention may secure the waterproof structure at the entry/exit portion for the lead-out wire even with a low cost and may be formed of a structure robust to vibration and impact so that the in-wheel motor has high reliability regarding waterproof performance.

Also, the in-wheel motor according to an embodiment of the present invention may not require structurally expanding a hollow portion of a shaft through which a lead-out wire enters and exits or changing the shape of the hollow portion to a complex shape in order to install a plurality of waterproof parts. Accordingly, it is possible to easily manufacture the in-wheel motor by a simple assembly process.

The in-wheel motor according to an embodiment of the present invention may include a rim, a motor assembly, a cover, and a waterproof structure at an entry/exit portion for a lead-out wire.

A tire may be wrapped around an outer ring of the rim, which has a circular shape, and coupled to the rim. Also, a shaft may be connected to pass through the center of the circular rim.

The motor assembly may include a stator and a rotor.

The stator may be connected to the shaft and receive power via the lead-out wire. Specifically, the stator may be wrapped around the shaft and fixed so as not to rotate together with the shaft.

The rotor may be disposed to be wrapped around the stator. Also, a predetermined gap may be formed between the rotor and the stator.

When power is supplied to the stator, an electromagnetic force may be generated between the stator and the rotor, and the rotor may rotate about the stator at an outer portion of the stator.

Here, both the stator and the rotor may be disposed at an inner portion of the rim.

The cover may cover and be coupled to one open side surface of the rim. A plurality of electronic parts vulnerable to moisture, such as the motor assembly, may be embedded in the inner portion of the rim to which the cover is coupled. Accordingly, the cover may cover and be coupled to the open side surface of the rim and shield the inner portion of the rim from the outside so that the waterproof structure is secured.

The waterproof structure at the entry/exit portion for the lead-out wire may seal the entry/exit portion for the lead-out wire which is connected to supply power from the outside of the in-wheel motor to the inner portion of the rim via the hollow portion of the shaft.

The waterproof structure at the entry/exit portion for the lead-out wire may include an elastic stopper and a stopper fixing body.

The elastic stopper may be inserted into the hollow portion of the shaft in an axial direction and then elastically contracted inside the hollow portion due to being pressed by the stopper fixing body.

The lead-out wire may be connected to pass through the center of the elastic stopper.

When the elastic stopper is elastically contracted, a portion between the hollow portion of the shaft and the lead-out wire may be completely sealed by the elastic stopper.

The elastic stopper may be formed of a conical rubber material.

The stopper fixing body may be fastened and fixed to the shaft.

While being fastened to the shaft, the stopper fixing body may press the elastic stopper in the axial direction and push the elastic stopper into the hollow portion of the shaft.

Accordingly, by the fastening of the stopper fixing body, the elastic stopper in an elastically contracted state may be inserted and fixed into the hollow portion of the shaft by using a forcibly fitting method.

Meanwhile, the elastic stopper may have a shape in which a diameter gradually increases from one end portion, which is inserted into the hollow portion of the shaft first, toward the other end portion, which is inserted into the hollow portion of the shaft later due to being pressed by the stopper fixing body.

A conical surface may be formed around a circumference of the elastic stopper.

The hollow portion of the shaft may include a hollow expansion surface in which, at the entry/exit portion for the lead-out wire, an internal diameter portion of the hollow portion of the shaft gradually expands from an insertion position of the one end portion of the elastic stopper toward an insertion position of the other end portion of the elastic stopper.

Also, the elastic stopper may be formed so that, when the elastic stopper is elastically contracted, a diameter of the one end portion has a size corresponding to a size of the smallest internal diameter among sizes of internal diameters of the hollow expansion surface.

Also, the elastic stopper may be formed so that, when the elastic stopper is elastically contracted, a diameter of the other end portion has a size corresponding to a size of the largest internal diameter among the sizes of the internal diameters of the hollow expansion surface.

The lead-out wire may be connected to pass through an internal diameter portion of the elastic stopper. When the elastic stopper is elastically contracted, the internal diameter portion of the elastic stopper may have an internal diameter whose size corresponds to a size of a diameter of the lead-out wire.

The stopper fixing body may include a central hole to which the lead-out wire is connected by passing through the center thereof. The central hole may be formed larger than the diameter of the lead-out wire.

As an exemplary embodiment, the stopper fixing body may be in the shape of a circular plate and fastened using a plurality of fastening screws so as to face a distal end portion of the shaft and press the elastic stopper.

The fastening screws may be sequentially fastened to a plurality of screw holes formed at an edge of the stopper fixing body and a plurality of screw grooves formed at the distal end portion of the shaft corresponding to the plurality of screw holes.

As another exemplary embodiment, the stopper fixing body may include a first body portion and a second body portion.

The first body portion may be in the shape of a circular plate and press the elastic stopper.

The second body portion may protrude in the shape of a circular tube along an edge of the first body portion and have a female screw portion screw-coupled to a male screw portion formed at the distal end portion of the shaft.

To achieve another one of the above objectives, the present invention provides an in-wheel motor capable of securing a waterproof structure for an inner portion of a rim as well as a waterproof structure at an entry/exit portion for a lead-out wire.

In securing the waterproof structure for the inner portion of the rim, the in-wheel motor according to the present invention may secure the waterproof structure without increasing a diameter of the in-wheel motor.

Also, the in-wheel motor according to the present invention may improve structural rigidity of the rim itself by using the rim having an integrated structure and allow a tire to be replaced just by separating a cover.

The in-wheel motor according to an embodiment of the present invention may include the rim, a motor assembly, the cover, a tire separation preventing bump, a rim-cover waterproof structure, and the waterproof structure at the entry/exit portion for the lead-out wire.

The tire separation preventing bump may include first and second tire separation preventing bumps. The first tire separation preventing bump may protrude from one side of the rim, and the second tire separation preventing bump may protrude from the cover coupled to the other side of the rim. In this way, the tire separation preventing bump may be formed on each of the rim and the cover and prevent separation of the tire without a task separating the cover.

The rim-cover waterproof structure may include a bolt fastening portion provided using the protruding shape of the second tire separation preventing bump.

The bolt fastening portion is required for fastening a bolt between the rim and the cover and may firmly fix between the rim and the cover using a fastening bolt. In this way, because it is possible to seal a space in the inner portion of the rim, the waterproof structure for the inner portion of the rim may be secured.

Because the bolt fastening portion is formed at the second tire separation preventing bump, an installation space for forming the bolt fastening portion is not required, thus it is possible to not increase the diameter of the in-wheel motor. The cover may include a circular cover body corresponding to the other side of the rim and an edge protrusion that protrudes from an edge of the cover body toward the rim and is coupled in close contact with a step of the rim.

The second tire separation preventing bump may be formed to intersect a protruding direction of the edge protrusion from a protruding front portion of the edge protrusion.

The second tire separation preventing bump may have the same size and shape as the first tire separation preventing bump.

The bolt fastening portion may include a first bolt fastening portion and a second bolt fastening portion.

The first bolt fastening portion may be formed in the protruding direction of the edge protrusion at an inner side of the edge protrusion. The second bolt fastening portion may be formed to face a front portion of the first bolt fastening portion and extend parallel to the first bolt fastening portion from the other side of the rim.

The first bolt fastening portion and the second bolt fastening portion may be sequentially fastened by a fastening bolt.

The fastening bolt may include a bolt head, a first bolt body protruding from a center of the bolt head, and a second bolt body extending and protruding from the first bolt body.

The bolt head may be inserted into an inclined hole disposed behind the first bolt fastening portion when fastening of the fastening bolt is completed. The first bolt body may be fastened to pass through a screw hole of the first bolt fastening portion. The second bolt body may be inserted into and fastened to the second bolt fastening portion.

The second bolt fastening portion may have a smaller diameter than the screw hole of the first bolt fastening portion. Also, the second bolt fastening portion may have a shorter length than the screw hole of the first bolt fastening portion.

Meanwhile, a front end portion of the edge protrusion may come in close contact with a wall surface portion of the step of the rim.

An internal diameter portion of the edge protrusion may come in close contact with an external diameter portion of the step of the rim.

At least one O-ring may be provided between the internal diameter portion of the edge protrusion and the external diameter portion of the step of the rim. An O-ring accommodating portion, which is in the shape of a groove having a size capable of accommodating the O-ring, may be further provided at the external diameter portion of the step of the rim.

The O-ring accommodating portion may be in the shape of a rectangular groove in which a horizontal length is longer than a vertical height.

The vertical height of the O-ring accommodating portion may be formed to be smaller than a diameter of an initial shape of the O-ring before the cover and the rim are assembled. The horizontal length of the O-ring accommodating portion may be formed to be larger than the diameter of the initial shape of the O-ring before the cover and the rim are assembled.

Before the cover and the rim are assembled, an upper end portion of the O-ring disposed in the O-ring accommodating portion may protrude higher than the O-ring accommodating portion. Also, after the cover and the rim are assembled, the upper end portion of the O-ring may be vertically pressed by the edge protrusion and deformed to have an elliptical cross-section that is horizontally elongated. Thus, sealing performance may be improved.

A bent groove may be formed at an edge of the front end portion of the edge protrusion. Also, an outer boundary protruding portion that has a shape corresponding to the bent groove and comes in close contact with the bent groove may be formed at an edge of the wall surface portion of the step of the rim.

Boundary surfaces of the bent groove and the outer boundary protruding portion that come in close contact with each other may be bent at a right angle. Thus, a flow path along which moisture enters the in-wheel motor from the outside may be formed to be complex, and waterproof performance may be reinforced.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
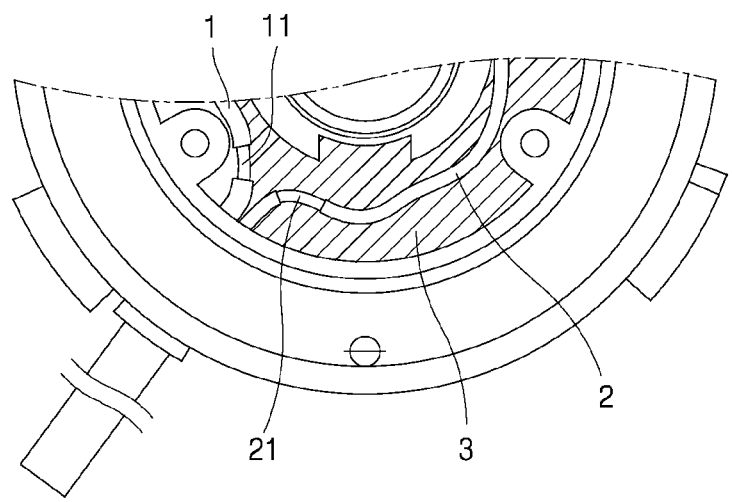
FIG. 1 is a conceptual diagram schematically illustrating a waterproof sealing structure for a lead-out wire of a motor according to a related art.

Hereinafter, embodiments of the present invention will be described in detail with reference to the accompanying drawings to allow those of ordinary skill in the art to which the present invention pertains to easily practice the present invention. The present invention may be implemented in various different forms and is not limited by the embodiments described herein.

To clearly describe the present invention, parts unrelated to the description will be omitted, and like or similar elements will be denoted by like reference numerals throughout. Also, some embodiments of the present invention will be described in detail with reference to the exemplary drawings. In giving reference numerals to elements in each drawing, like reference numerals may be given to like elements as much as possible even when the elements are illustrated in different drawings. In addition, in describing the present invention, when detailed description on a known related art or function is deemed to obscure the gist of the present invention, the detailed description thereof may be omitted.

In describing the elements of the present invention, when a certain element is described as being "connected," "coupled," or "linked" to another element, this may mean that the element is directly connected or linked to the other element but may also mean that the element is "connected," "coupled," or "linked" to the other element via another element "interposed" therebetween or the element and the other element are "connected," "coupled," or "linked" through different elements.

Overall Structure of in-Wheel Motor

Figure 2:
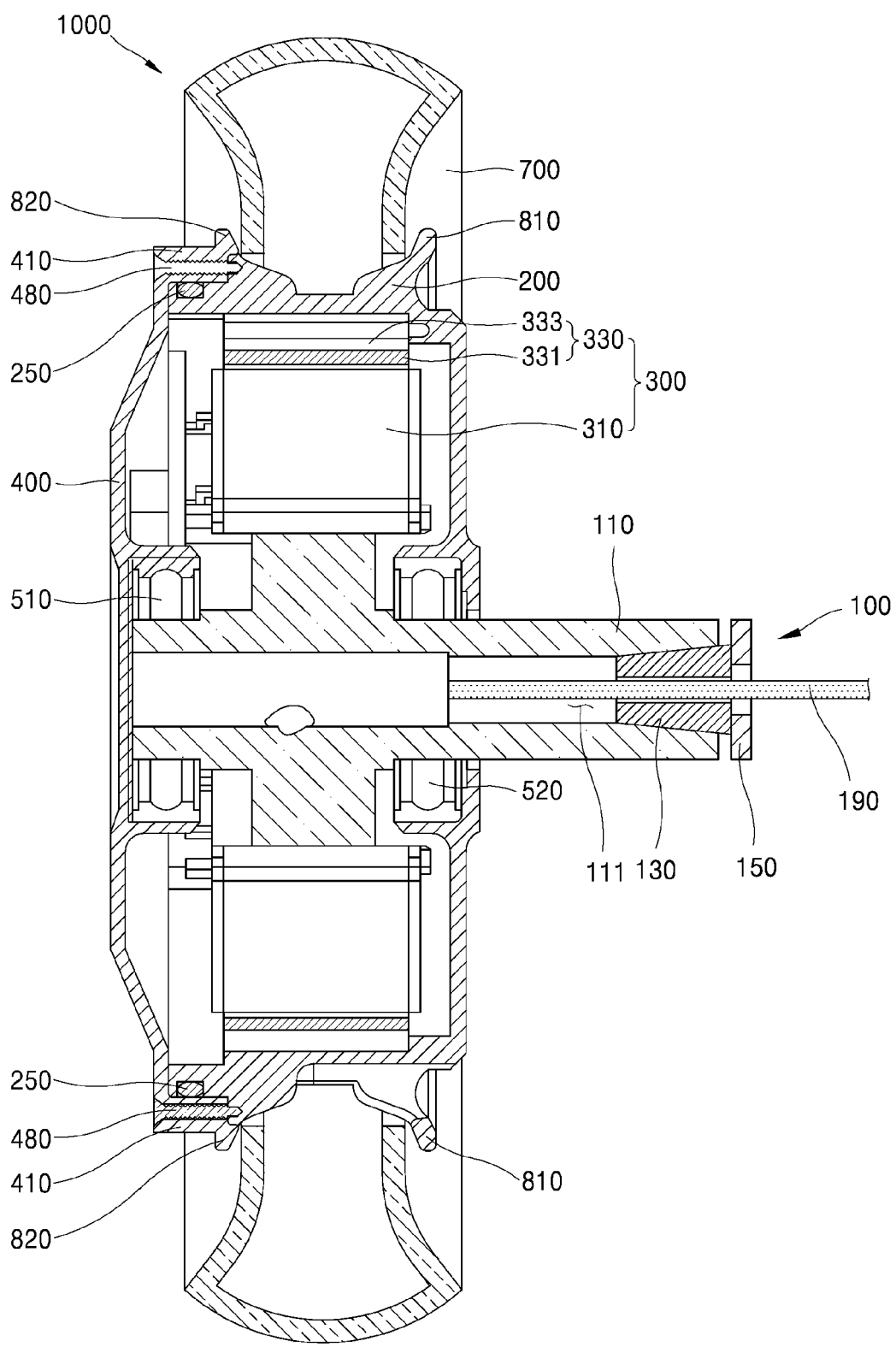
FIG. 2 is a cross-sectional view schematically illustrating an in-wheel motor according to an embodiment of the present invention.
Figure 3:
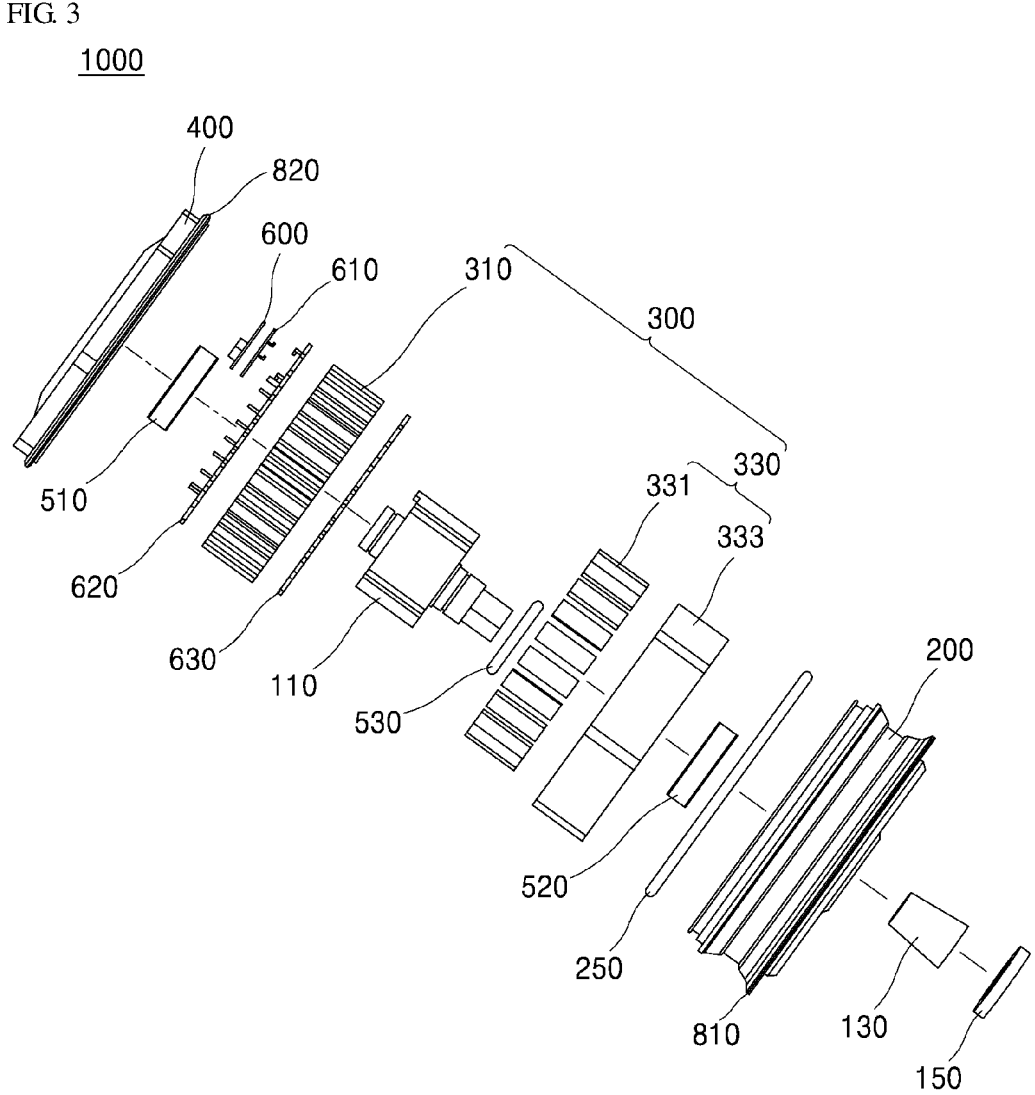
FIG. 3 is an exploded perspective view schematically illustrating the in-wheel motor according to an embodiment of the present invention.

FIG. 2 is a cross-sectional view schematically illustrating an in-wheel motor according to an embodiment of the present invention, and FIG. 3 is an exploded perspective view schematically illustrating the in-wheel motor according to an embodiment of the present invention.

In an in-wheel motor 1000 according to an embodiment of the present invention, a waterproof structure is secured at an entry/exit portion for a wire 190 (hereinafter referred to as "lead-out wire 190") that is connected from an outer portion of the in-wheel motor to an inner portion thereof for power supply.

The in-wheel motor 1000 according to an embodiment of the present invention may secure the waterproof structure at the entry/exit portion for the lead-out wire 190 even at a low cost. Also, the in-wheel motor 1000 has a structure which is more robust to vibration or impact as compared to when a conventional sealing treatment is performed using silicone or the like. In this way, product reliability may be improved.

Also, unlike the conventional structure, the in-wheel motor 1000 is capable of securing the waterproof structure without expanding, or changing the shape of, a hollow portion 111 of a shaft 110 through which the lead-out wire 190 enters and exits.

Also, because there is no need to change the shape of the hollow portion 111 of the shaft 110 to a complex shape, the waterproof structure may be easily secured by performing a simple assembly task and a fastening task while the shaft 110 is used as it is.

Hereinafter, the overall structure of the in-wheel motor 1000 according to an exemplary embodiment of the present invention will be described.

Referring to FIGS. 2 and 3, the in-wheel motor 1000 includes a rim 200, a motor assembly 300, a cover 400, a lead-out wire entry/exit portion waterproof structure 100, and a rim-cover waterproof structure, which is formed of tire separation preventing bumps 810 and 820 and a bolt fastening portion 420.

In addition, the in-wheel motor 1000 further includes a Hall sensor substrate 600 (see FIG. 3), bearings 510 and 520, and O-rings 530 and 250 (see FIG. 3).

The rim 200 is a circular rigid member forming a wheel.

A tire 700 may be wrapped around and coupled to an outer ring of the rim 200.

Specifically, a hollow portion having a predetermined size is provided at an inner side of the rim 200.

The shaft 110 and various electronic parts (e.g., a Hall sensor), such as the motor assembly 300, may be disposed in the hollow portion of the rim 200.

The motor assembly 300 is coupled to the inner side of the rim 200.

Specifically, the motor assembly 300 is coupled between the shaft 110 and the rim 200.

The motor assembly 300 includes a stator 310 and a rotor 330.

The stator 310 is connected to the shaft 110 and receives power from the outside via the lead-out wire 190 for power supply.

Specifically, the lead-out wire 190 may be connected from the outside of the in-wheel motor 1000 to the inner portion of the rim 200 via the hollow portion 111 of the shaft 110. The lead-out wire 190 connected to the inner portion of the rim 200 supplies power to the stator 310.

The stator 310 is disposed in the inner portion of the rim 200.

Specifically, the stator 310 is disposed in a form wrapped around the shaft 110 in the inner portion of the rim 200.

For example, a structure referred to as "hub" may be further provided at an inner side of the stator 310, and the shaft 110 may be formed of a structure which is coupled by passing through the center of the hub.

The rotor 330 is disposed to be wrapped around the stator 310 while a predetermined gap is formed therebetween.

When the stator 310 receives power via the lead-out wire 190, an electromagnetic force is generated between the stator 310 and the rotor 330. Accordingly, the rotor 330 rotates about the stator 310 at an outer side of the stator 310.

The rotor 330 includes a magnet portion 331 and a core portion 333.

The magnet portion 331 may be formed of a permanent magnet. The core portion 333 surrounds and fixes the magnet portion 331. In other words, the core portion 333 corresponds to a body structure of the rotor 330 that fixes the magnet portion 331.

The stator 310 and the rotor 330 are disposed in the inner portion of the rim 200. While the stator 310 is connected to the shaft 110, the rotor 330 is connected to the rim 200.

Therefore, when the rotor 330 rotates, the rim 200 and the tire 700 fixed to the rim 200 rotate about the shaft 110 and move a moving means on which the in-wheel motor 1000 is mounted.

The cover 400 is coupled to cover one open side surface of the rim 200 and seals the inner portion of the rim 200 from the outside.

The cover 400 seals the inner portion of the rim 200 from the outside and protects a plurality of electronic parts vulnerable to moisture, such as the motor assembly 300.

That is, coupling of the cover 400 allows the waterproof structure to be secured for the inner portion of the rim 200. This will be described in detail below when describing the rim-cover waterproof structure.

Meanwhile, the lead-out wire entry/exit portion waterproof structure 100 allows the waterproof function to be secured at the opposite side of the cover 400, i.e., at the entry/exit portion for the lead-out wire 190 which enters and exits through the hollow portion 111 of the shaft 110.

In other words, the lead-out wire entry/exit portion waterproof structure 100 seals the entry/exit portion for the lead-out wire 190 which supplies power from the outside of the in-wheel motor 1000 to the inner portion of the rim 200 via the hollow portion 111 of the shaft 110.

Specifically, the lead-out wire entry/exit portion waterproof structure 100 includes an elastic stopper 130 and a stopper fixing body 150.

The elastic stopper 130 may be inserted into the hollow portion 111 of the shaft 110 in an axial direction and then elastically contracted inside the hollow portion 111 due to being compressed by the stopper fixing body 150.

The lead-out wire 190 is connected to pass through the center of the elastic stopper 130.

Also, when the elastic stopper 130 is elastically contracted inside the hollow portion 111, a gap between the hollow portion 111 of the shaft 110 and the lead-out wire 190 is completely sealed.

For example, the elastic stopper 130 may be formed of a conical (or wedge-shaped) rubber material.

However, the material of the elastic stopper 130 is not limited to rubber and may be any other material self-evident to those of ordinary skill in the art among elastic materials which have high durability and physical properties similar to those of rubber.

The stopper fixing body 150 is fastened and fixed to the shaft 110.

Specifically, the stopper fixing body 150 may be fastened and fixed to the shaft 110 in a direction in which the hollow portion 111 of the shaft 110 is blocked at a portion where the hollow portion 111 of the shaft 110 starts, i.e., at a position of the entry/exit portion for the lead-out wire 190.

In this way, due to the stopper fixing body 150 fastened and fixed to the shaft 110, the elastic stopper 130 is pressed in the axial direction toward the inside of the hollow portion 111 of the shaft 110.

As a result, the elastic stopper 130 is elastically contracted and seals between the hollow portion 111 of the shaft 110 and the lead-out wire 190, and the stopper fixing body 150 is firmly fastened and fixed to the shaft 110 and continuously maintains the elastically contracted state of the elastic stopper 130.

That is, just by the stopper fixing body 150 being fastened to the shaft 110 using a separate bolt or being directly screw-coupled to a distal end portion of the shaft 110, the elastic stopper 130 may seal the entry/exit portion for the lead-out wire 190 and secure the waterproof structure.

The lead-out wire entry/exit portion waterproof structure 100 will be described in more detail below with reference to FIGS. 4 to 9.

Meanwhile, the in-wheel motor 1000 may secure the rim-cover waterproof structure that may have a function of waterproofing the inner portion of the rim through fastening between the rim 200 and the cover 400.

For the rim-cover waterproof structure, the in-wheel motor 1000 of the present invention includes first and second tire separation preventing bumps 810 and 820.

Also, the in-wheel motor 1000 uses a protruding structure of the second tire separation preventing bump 820 to secure a space for forming bolt fastening portions 420 and 220 (see FIG. 10) configured to fasten between the rim 200 and the cover 400 without increasing the diameter of the in-wheel motor 1000.

The tire separation preventing bumps 810 and 820 prevent separation of the tire 700 (see FIG. 2) mounted on the in-wheel motor 1000.

Specifically, the tire separation preventing bumps 810 and 820 include the first tire separation preventing bump 810 and the second tire separation preventing bump 820.

The first tire separation preventing bump 810 protrudes from one side of the rim 200 and is integrally formed with the rim 200.

The second tire separation preventing bump 820 is disposed at the cover 400 coupled to a side surface at the other side of the rim 200 and protrudes from the cover 400 in a direction parallel to the first tire separation preventing bump 810.

Here, the one side of the rim 200 refers to an inner side of the tire 700, and the other side of the rim 200 refers to an outer side of the tire 700.

The bolt fastening portions 420 and 220 (see FIG. 13) firmly couple the rim 200 and the cover 400 by screw-coupling of a fastening bolt 480 (see FIG. 13) and prevent external moisture from entering an inner space of the rim 200.

The rim-cover waterproof structure will be described in more detail below with reference to FIGS. 10 to 13.

Meanwhile, the in-wheel motor 1000 includes the Hall sensor substrate 600 (see FIG. 3).

The Hall sensor substrate 600 (see FIG. 3) includes a Hall sensor configured to sense a magnetic force in the motor assembly 300.

Therefore, preferably, the Hall sensor substrate 600 (see FIG. 3) is disposed in the vicinity of the motor assembly 300.

For example, the Hall sensor substrate 600 (see FIG. 3) may include at least one Hall sensor, e.g., two Hall sensors.

The Hall sensor substrate 600 (see FIG. 3) may further include a separate substrate insulator 610 (see FIG. 3). The Hall sensor substrate 600 (see FIG. 3) may be firmly fixed at an initial installation position due to the substrate insulator 610.

Meanwhile, the in-wheel motor 1000 includes the plurality of bearings 510 and 520.

The first bearing 510 is disposed at a front end of the shaft 110 and reduces rolling friction. The second bearing 520 is disposed at a rear end of the shaft 110 and reduces rolling friction.

For example, referring to FIG. 2, the first bearing 510 is disposed between the cover 400 and a front end portion of the shaft 110 and reduces contact friction at the front end portion of the shaft 110 to aid in smooth rotation of the tire 700.

Likewise, the second bearing 520 is disposed at the rear end of the shaft 110 and reduces contact friction to aid in smooth rotation of the tire 700.

In this way, the bearings 510 and 520 are installed in a structure supporting both the front end and the rear end of the shaft 110, thereby allowing stable and smooth rotation of the tire 700.

Also, the in-wheel motor 1000 includes the plurality of O-rings 530 and 250 (see FIG. 3).

One O-ring 530 (see FIG. 3) may be disposed at the shaft 110.

The other O-ring 250 (see FIG. 2) may be disposed at a fastening portion between the cover 400 and the rim 200 and take charge of the waterproof function between the rim and the cover.

Also, the in-wheel motor 1000 includes a plurality of insulators 620 and 630. The plurality of insulators 620 and 630 may be fixed and coupled to the motor assembly 300, more specifically, to the stator 310.

By being configured as described above, the in-wheel motor 1000 may simultaneously secure both the waterproof structure at the entry/exit portion for the lead-out wire 190 provided through the hollow portion 111 of the shaft and the waterproof structure between the rim 200 and the cover 400.

The in-wheel motor 1000 has a structure which is more robust to vibration and impact as compared to a conventional structure in which sealing is performed using silicone or the like. Thus, reliability regarding the waterproof function may be improved.

Also, despite not using conventional expensive waterproof parts (e.g., a cable gland and the like), the in-wheel motor 1000 is able to secure waterproof performance at an equivalent or higher level.

Also, because the in-wheel motor 1000 does not require structurally expanding the hollow portion 111 of the shaft 110, through which the lead-out wire 190 enters and exits, or changing the shape of the hollow portion 111 to have a complex structure to install a plurality of waterproof parts, productivity may be improved.

Waterproof Structure at Entry/Exit Portion for Lead-Out Wire

Next, the waterproof structure at the entry/exit portion for the lead-out wire of the in-wheel motor according to an embodiment of the present invention will be described in detail with reference to FIGS. 4 to 9.

Figure 4:
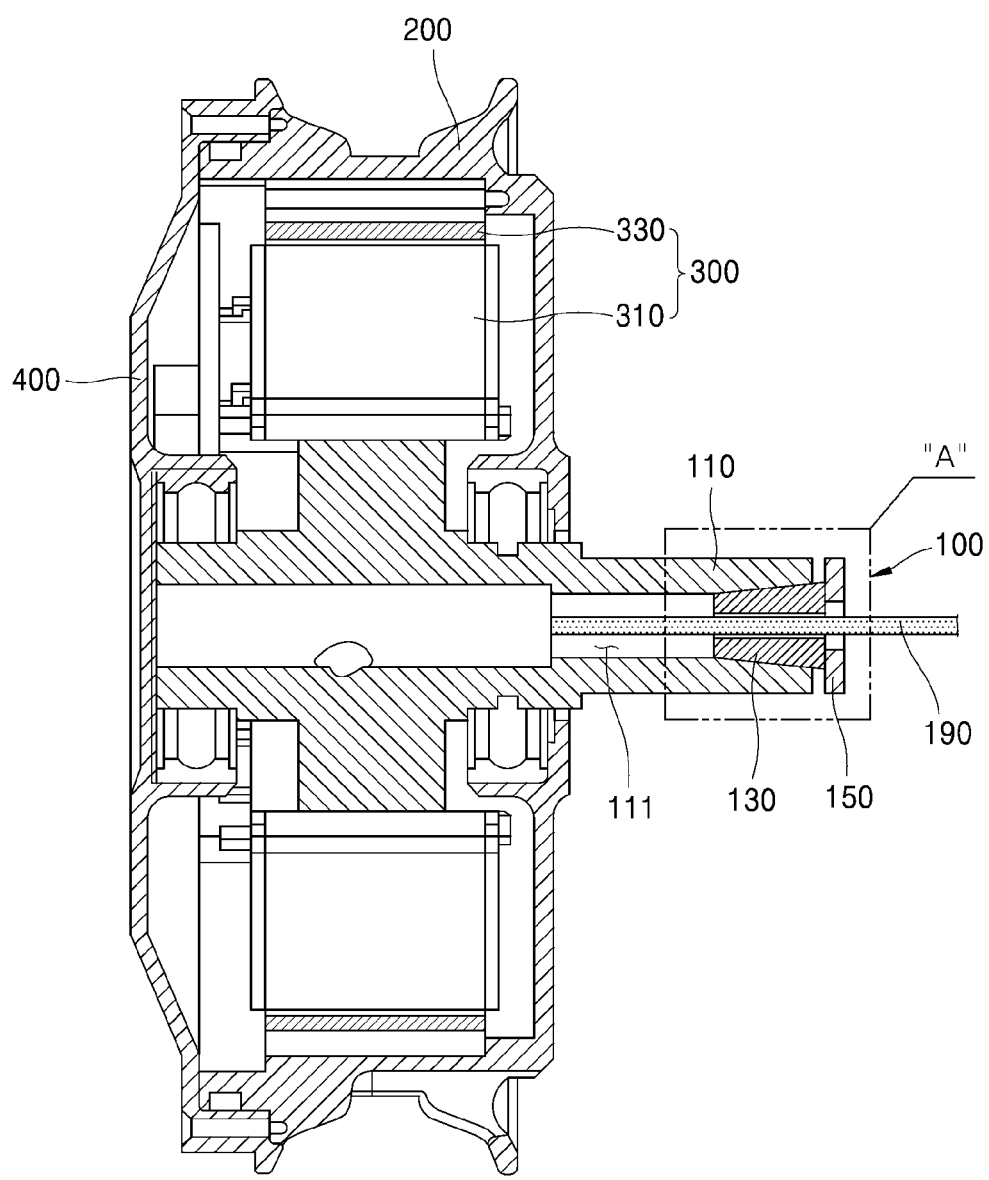
FIG. 4 is a cross-sectional view for describing a waterproof structure at an entry/exit portion for a lead-out wire of the in-wheel motor according to an embodiment of the present invention.

FIG. 4 is a cross-sectional view for describing a waterproof structure at an entry/exit portion for a lead-out wire of the in-wheel motor.

As illustrated, the in-wheel motor 1000 includes the lead-out wire entry/exit portion waterproof structure 100 in addition to the rim 200 formed of an integrated structure, the cover 400 coupled to the side surface of the rim 200, and the motor assembly 300 including the stator 310 and the rotor 330.

The lead-out wire entry/exit portion waterproof structure 100 waterproofs the opposite side of the cover 400, i.e., the entry/exit portion for the lead-out wire 190 that enters and exits through the hollow portion 111 of the shaft 110.

The lead-out wire 190 refers to a wire connected from the outside of the in-wheel motor 100 to the inside thereof to supply power.

The lead-out wire entry/exit portion waterproof structure 100 includes the elastic stopper 130 and the stopper fixing body 150.

The elastic stopper 130 is inserted into the hollow portion 111 of the shaft 110 in the axial direction and then compressed by the stopper fixing body 150.

In this way, the elastic stopper 130 is elastically contracted so that airtightness is maintained around the lead-out wire 190 inside the hollow portion 111 of the shaft 110.

Particularly, the lead-out wire 190 is connected to pass through the center of the elastic stopper 130. Accordingly, when the elastic stopper 130 is elastically contracted inside the hollow portion 111, a gap between the hollow portion 111 of the shaft 110 and the lead-out wire 190 is completely sealed.

The elastic stopper 130 may be formed of a conical or wedge-shaped rubber material.

However, the material of the elastic stopper 130 is not limited to rubber and may be any other material self-evident to those of ordinary skill in the art among elastic materials which have high durability and physical properties similar to those of rubber.

The stopper fixing body 150 is fastened and fixed to the shaft 110 and maintains the elastically contracted state of the elastic stopper 130 inserted into the hollow portion 111 of the shaft 110.

In this way, the stopper fixing body 150 serves to maintain the waterproof function between the hollow portion 111 of the shaft 110 and the lead-out wire 190 due to the elastic stopper 130.

Hereinafter, the waterproof structure at the entry/exit portion for the lead-out wire of the present invention will be described in detail with reference to FIGS. 5 to 7.

Figure 5:
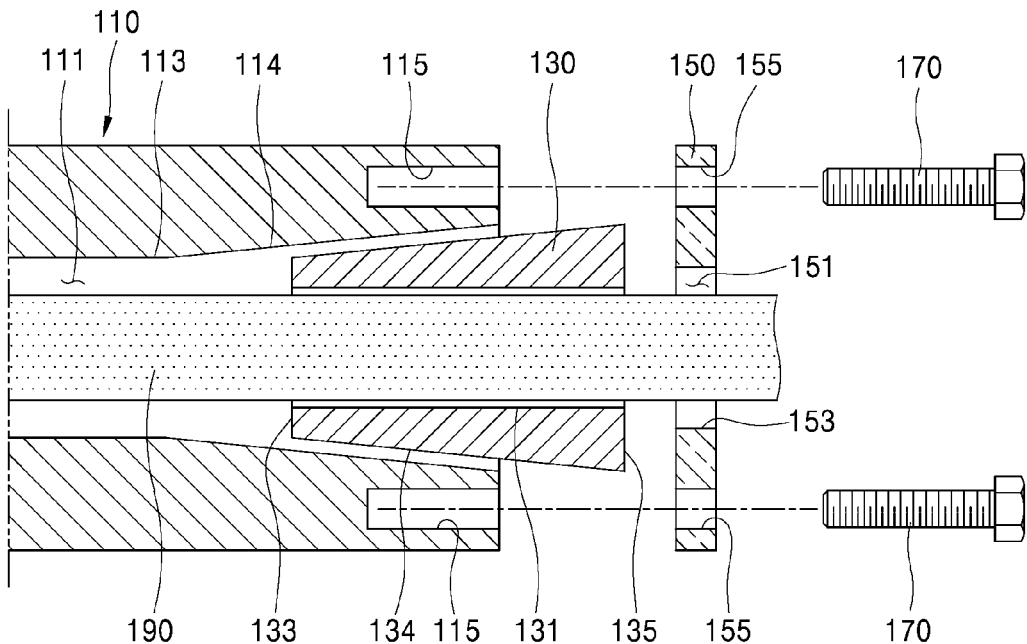
FIG. 5 is an enlarged cross-sectional view of region "A" of FIG. 4 and is for describing the waterproof structure at the entry/exit portion for the lead-out wire of the in-wheel motor according to an embodiment of the present invention.

FIG. 5 is an enlarged cross-sectional view of the waterproof structure at the entry/exit portion for the lead-out wire of the in-wheel motor and is an enlarged view of region "A" of FIG. 4. FIGS. 6 and 7 are enlarged cross-sectional views showing states before and after fastening the waterproof structure at the entry/exit portion for the lead-out wire of the in-wheel motor.

As illustrated, the lead-out wire entry/exit portion waterproof structure 100 is formed at a position where the lead-out wire 190 enters and exits through the distal end portion of the hollow portion 111 of the shaft 110.

The lead-out wire 190 is connected to pass through the center of the elastic stopper 130.

To this end, an internal diameter portion 131 that has an internal diameter larger than a diameter D1 of the lead-out wire 190 is formed at the center of the elastic stopper 130.

Accordingly, the lead-out wire 190 may pass through the center of the elastic stopper 130 and be easily inserted into the hollow portion 111 of the shaft 110 in the axial direction.

Meanwhile, one end portion 133 of the elastic stopper 130 is inserted into the hollow portion 111 of the shaft 110 first, and the other end portion 135 of the elastic stopper 130 is inserted into the hollow portion 111 of the shaft 110 later due to being pressed by the stopper fixing body 150.

Here, a diameter of the one end portion 133 of the elastic stopper 130 may be formed smaller than a diameter of the other end portion 135 thereof.

For example, the elastic stopper 130 may have a conical shape whose diameter gradually increases from the one end portion 133 to the other end portion 135.

In this way, a conical surface 134 may be formed around a circumference of the elastic stopper 130.

Meanwhile, the hollow portion 111 of the shaft 110 has a shape in which an internal diameter portion of the hollow portion 111 gradually expands from an insertion position of the one end portion 133 of the elastic stopper 130 toward an insertion position of the other end portion 135 of the elastic stopper 130.

In this way, at the position where the lead-out wire 190 enters and exits, the hollow portion 111 of the shaft 110 may include a conical hollow expansion surface 114 in which the size of the hollow gradually increases toward the distal end portion of the shaft 110.

Specifically, when the elastic stopper 130 is elastically contracted, the diameter of the one end portion 133 of the elastic stopper 130 may have a size corresponding to a size of the smallest internal diameter among sizes of internal diameters of the hollow expansion surface 114. Also, when the elastic stopper 130 is elastically contracted, the diameter of the other end portion 135 of the elastic stopper 130 may have a size corresponding to a size of the largest internal diameter among the sizes of the internal diameters of the hollow expansion surface 114.

Figure 6:
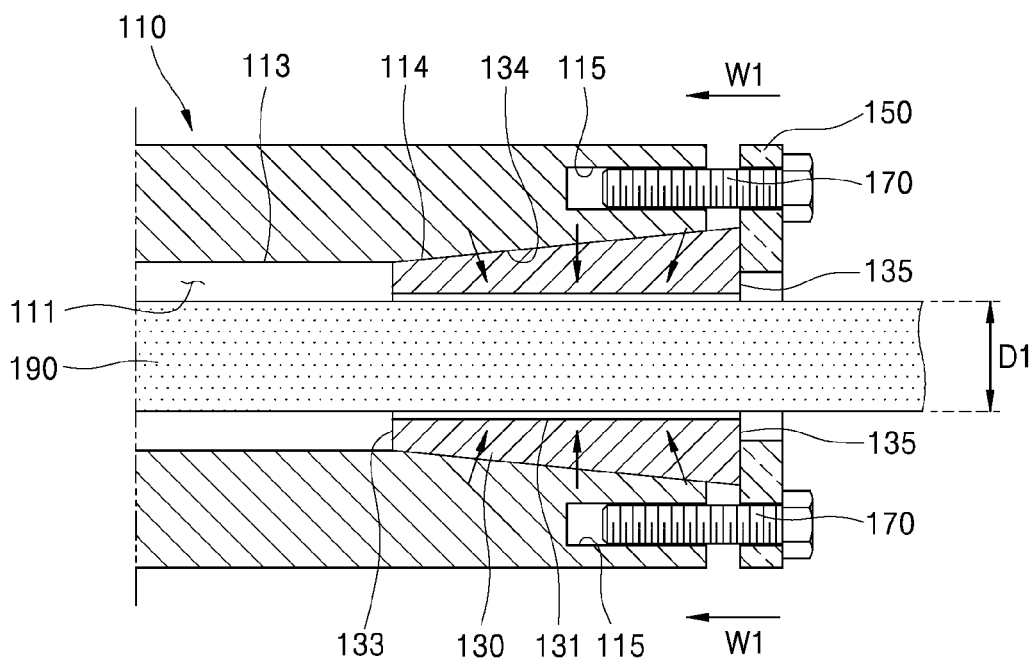
FIG. 6 is an enlarged cross-sectional view showing a process of fastening the waterproof structure at the entry/exit portion for the lead-out wire of the in-wheel motor according to an embodiment of the present invention.

Accordingly, due to the fastening action of the stopper fixing body 150, as illustrated in FIG. 6, the elastic stopper 130 is elastically contracted inside the hollow portion 111 of the shaft 110 in directions indicated by arrows.

Figure 7:
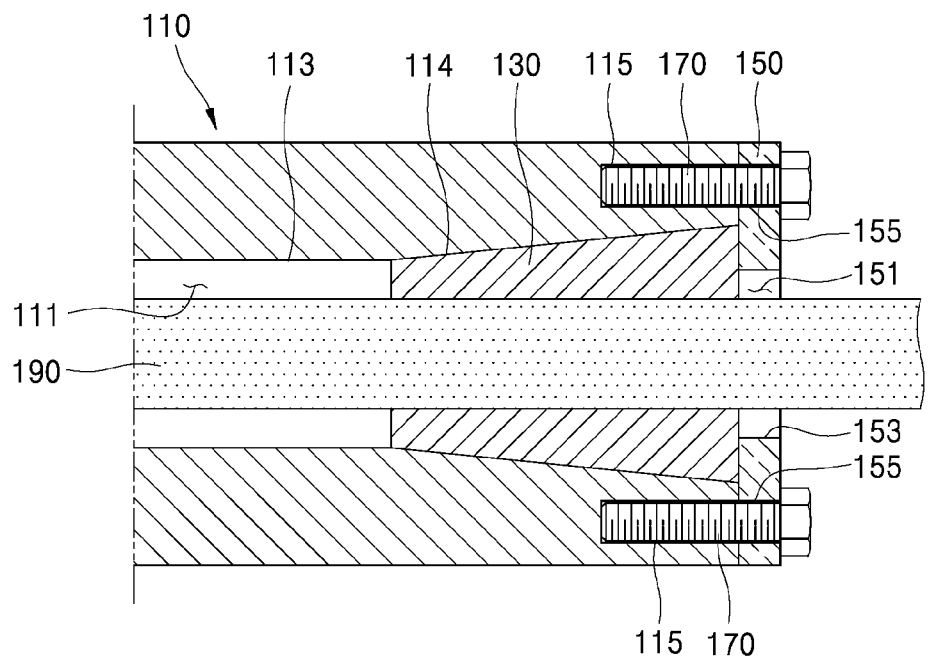
FIG. 7 is an enlarged cross-sectional view showing a state after the fastening of the waterproof structure at the entry/exit portion for the lead-out wire of the in-wheel motor according to an embodiment of the present invention.

Then, when, as illustrated in FIG. 7, the stopper fixing body 150 is completely fastened to the distal end portion of the shaft 110, the elastic stopper 130 in the elastically contracted state maintains a state of being compressed and inserted into the hollow portion 111.

As a result, the elastic stopper 130 pressed by the stopper fixing body 150 seals between the lead-out wire 190 and the hollow portion 111 of the shaft 110 and allows the waterproof structure to be secured.

The lead-out wire 190 may be connected to pass through the internal diameter portion 131 of the elastic stopper 130.

Also, when the elastic stopper 130 is elastically contracted, the internal diameter portion 131 of the elastic stopper 130 may be contracted to the size corresponding to the diameter D1 of the lead-out wire 190 or contracted to a size smaller than the diameter D1 of the lead-out wire 190.

The stopper fixing body 150 is fastened to the distal end portion of the shaft 110.

Referring to FIGS. 5 to 7, processes before and after the fastening of the stopper fixing body 150 are shown. Due to the fastening of the stopper fixing body 150, the elastic stopper 130 is elastically contracted and inserted and fixed inside the hollow portion 111 of the shaft 110.

Also, while the fastening of the stopper fixing body 150 is maintained, the elastic stopper 130 is not separated and detached from the shaft 110, and it is possible to maintain the secured waterproof structure.

The stopper fixing body 150 is fastened to the shaft 110 in a direction in which the portion where the lead-out wire 190 enters and exits is blocked.

The stopper fixing body 150 may include a central hole 151 to which the lead-out wire 190 is connected by passing through the center thereof.

A size of an internal diameter portion 153 of the central hole 151 formed at the center of the stopper fixing body 150 may be larger than the diameter D1 of the lead-out wire 190.

Specifically, the stopper fixing body 150 illustrated in FIGS. 5 to 7 may be in the shape of a circular plate.

Here, a size of an external diameter of the stopper fixing body 150, which is in the shape of a circular plate, may be formed to be the same as a size of an external diameter of the distal end portion of the shaft 110.

Also, the stopper fixing body 150 may be fastened using a plurality of fastening screws 170 so as to face the distal end portion of the shaft 110 and press the elastic stopper 130.

The fastening screws 170 are fastened to pass through a plurality of screw holes 155 formed at an edge of the stopper fixing body 150.

Then, the fastening screws 170 which passed through the screw holes 155 of the stopper fixing body 150 are fastened to a plurality of screw grooves 115 formed at the distal end portion of the shaft 110.

Here, the plurality of screw grooves 115 may be formed corresponding to positions of the plurality of screw holes 155.

In this way, as the plurality of fastening screws 170 are sequentially fastened to the screw holes 155 of the stopper fixing body 150 and the screw grooves 115 of the shaft 110, the stopper fixing body 150 is fastened to come in close contact with the shaft 110.

Due to a fastening force of the stopper fixing body 150, the other end portion 135 of the elastic stopper 130 is pressed toward the hollow portion 111 of the shaft 110 (that is, in a direction W1 (see FIG. 6), and the elastic stopper 130 in the elastically contracted state seals the entry/exit portion for the lead-out wire 190.

A state in which the elastic stopper 130 is elastically contracted inside the hollow portion 111 of the shaft 110 due to the fastening of the stopper fixing body 150, and thus the entry/exit portion for the lead-out wire 190 is sealed by the elastic stopper 130, is shown in FIG. 7.

Figure 8:
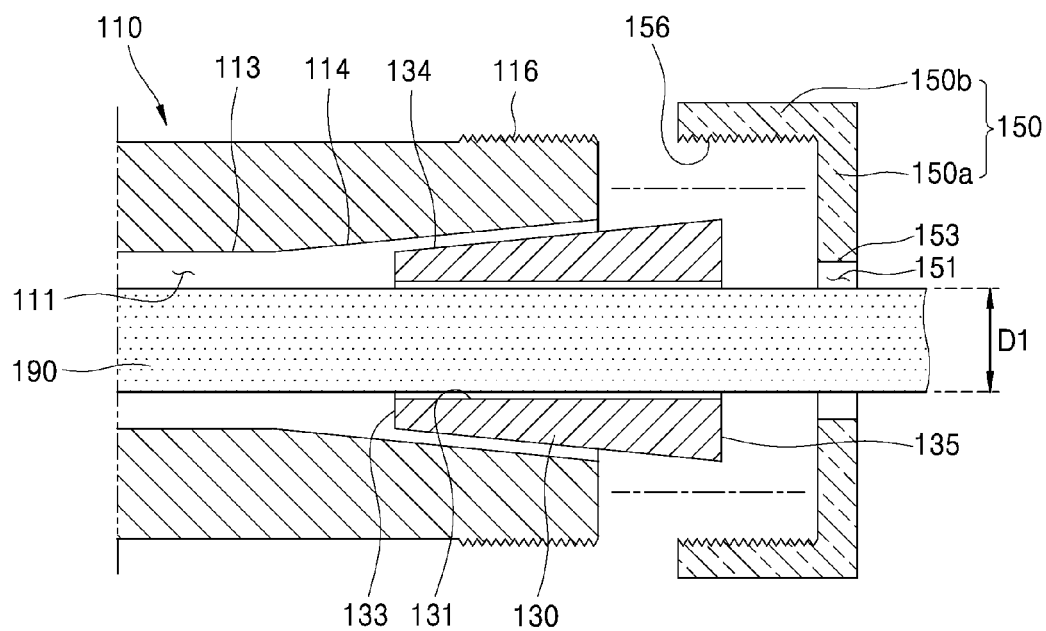
FIG. 8 is an enlarged cross-sectional view showing a state before fastening, as a modified example of the waterproof structure at the entry/exit portion for the lead-out wire of the in-wheel motor according to an embodiment of the present invention.
Figure 9:
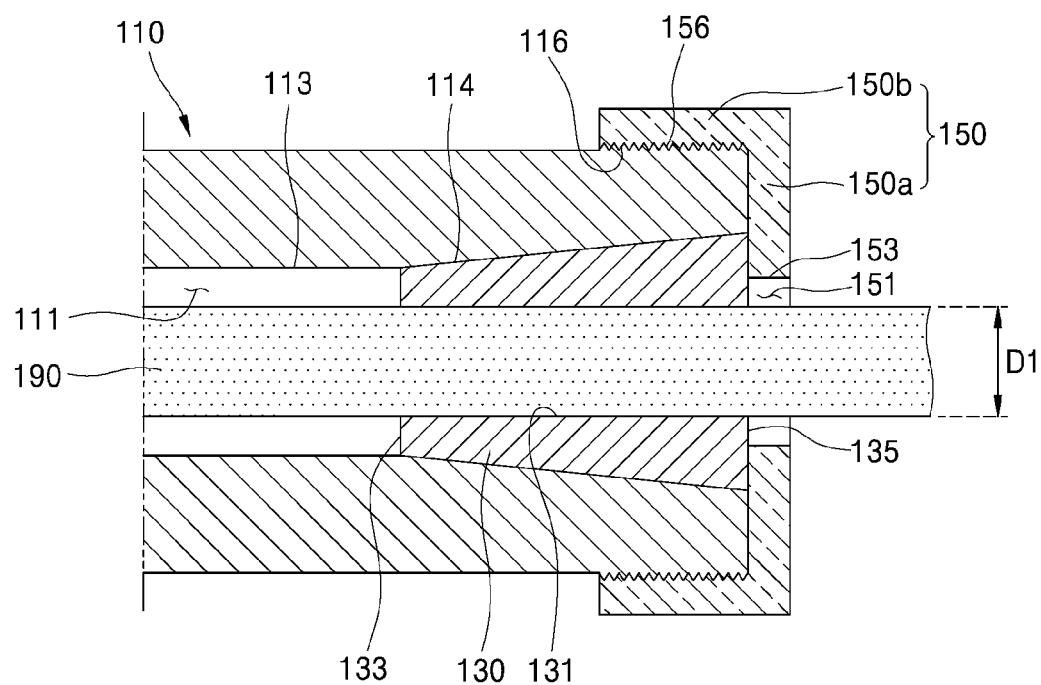
FIG. 9 is an enlarged cross-sectional view showing a state after the fastening, as a modified example of the waterproof structure at the entry/exit portion for the lead-out wire of the in-wheel motor according to an embodiment of the present invention.

FIGS. 8 and 9 are enlarged cross-sectional views showing states before and after the fastening, as modified examples of the waterproof structure at the entry/exit portion for the lead-out wire of the in-wheel motor.

Referring to FIGS. 8 and 9, the stopper fixing body 150 has a structure in which the stopper fixing body 150 is directly fastened to the distal end portion of the shaft 110 without using separate fastening screws 170 (see FIG. 7).

Specifically, the stopper fixing body 150 includes a first body portion 150a and a second body portion 150b.

The first body portion 150a is in the shape of a circular plate that has a size capable of pressing the elastic stopper 130.

For example, a diameter of the first body portion 150a may be larger than the diameter of the other end portion 135 of the elastic stopper 130.

Also, the central hole 151 through which the lead-out wire 190 passes is provided at the center of the first body portion 150a.

Particularly, an inner side surface of the first body portion 150a, i.e., a surface of the first body portion 150a that presses the other end portion 135 of elastic stopper 130 may be a flat surface.

The second body portion 150b protrudes in the shape of a circular tube along an edge of the first body portion 150a.

Screw threads, i.e., a female screw portion 156, configured to be screw-coupled to the distal end portion of the shaft 110 may be formed at the inner side surface of the second body portion 150b.

Also, screw threads, i.e., a male screw portion 116, configured to be screw-coupled to the female screw portion 156 of the second body portion 150b may be formed at the distal end portion of the shaft 110.

Accordingly, the elastic stopper 130 may be pressed just by performing a task of screw-fastening the stopper fixing body 150, which includes the first and second body portions 150a and 150b, to the distal end portion of the shaft 110, without using the separate fastening screws 170 (see FIG. 7).

For example, when the stopper fixing body 150 is fastened to the distal end portion of the shaft 110 while being rotated in a screw fastening direction, the other end portion 135 of the elastic stopper 130 is pressed against the inner side surface of the first body portion 150a and inserted into the hollow portion 111.

Referring to FIG. 9, it can be seen that, due to fastening between the female screw portion 156 of the second body portion 150b and the male screw portion 116 of the shaft 110, the elastic stopper 130 is inserted into the hollow portion 111 of the shaft 110, and the entry/exit portion for the lead-out wire 190 is sealed.

Rim-Cover Waterproof Structure

Next, a rim-cover waterproof structure of an in-wheel motor according to an embodiment of the present invention will be described in detail with reference to FIGS. 10 to 13.

Figure 10:
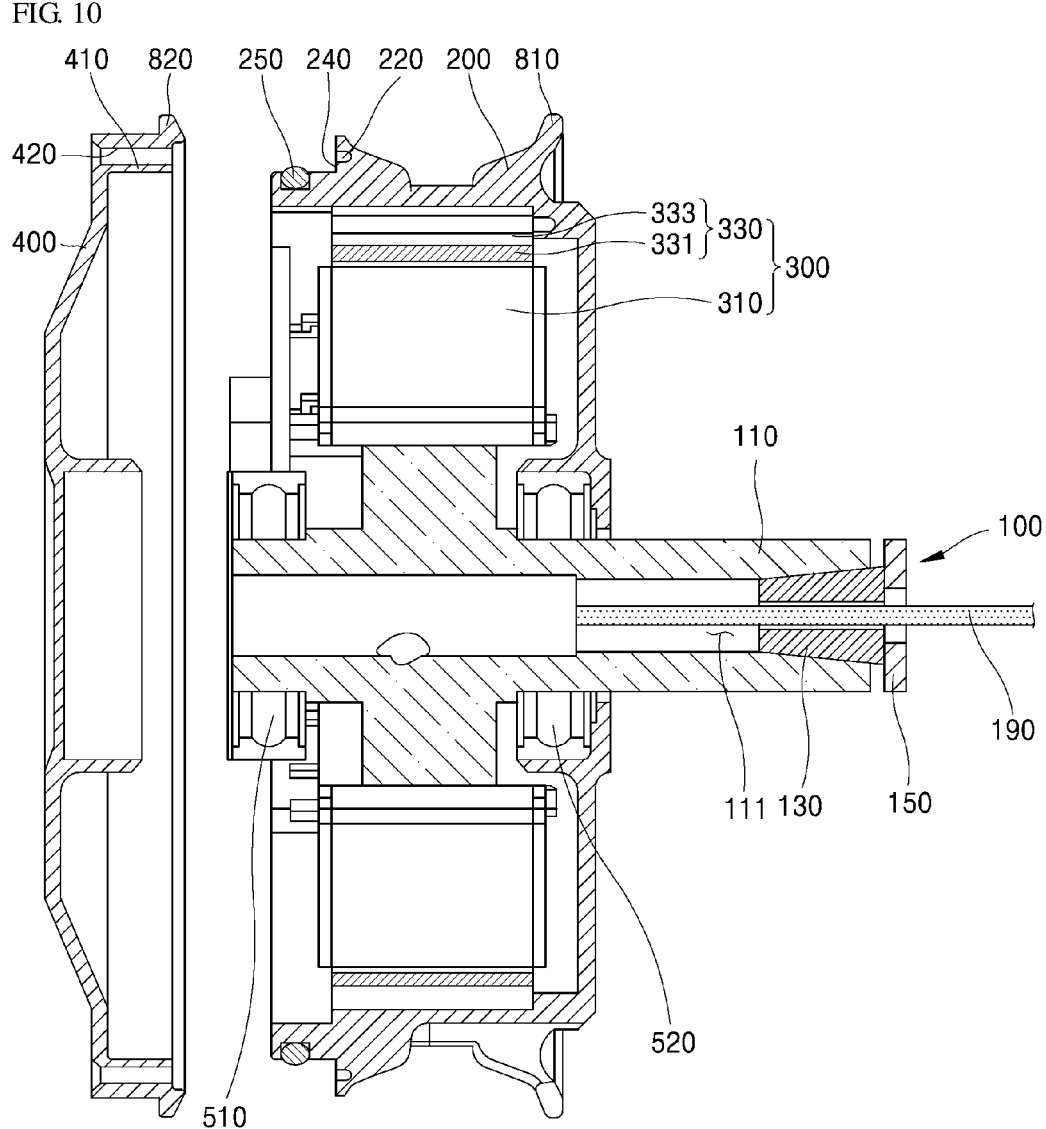
FIG. 10 is a cross-sectional view showing a state before coupling a rim and a cover in the in-wheel motor according to an embodiment of the present invention.
Figure 11:
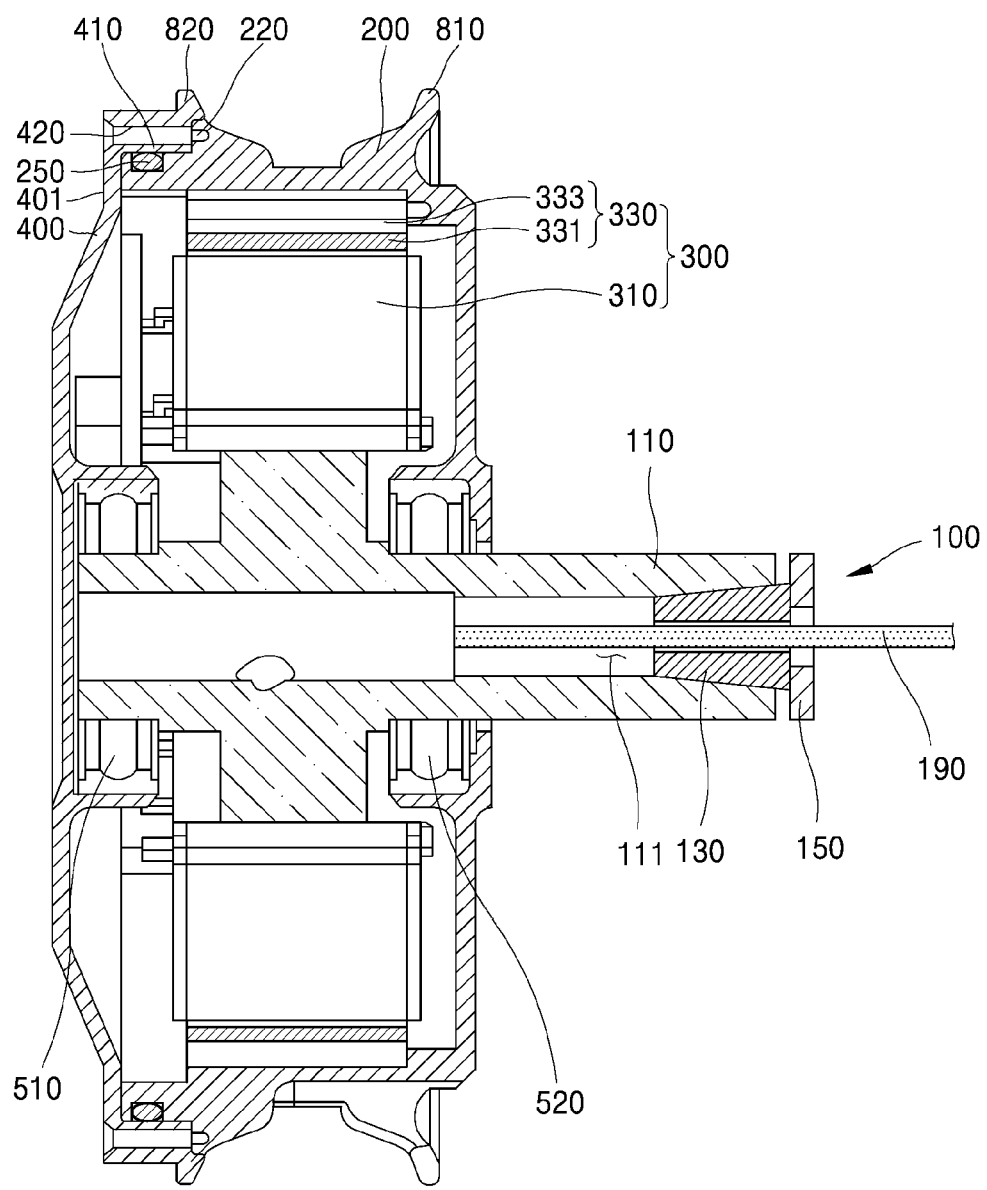
FIG. 11 is a cross-sectional view showing a state after the coupling of the rim and the cover in the in-wheel motor according to an embodiment of the present invention.
Figure 12:
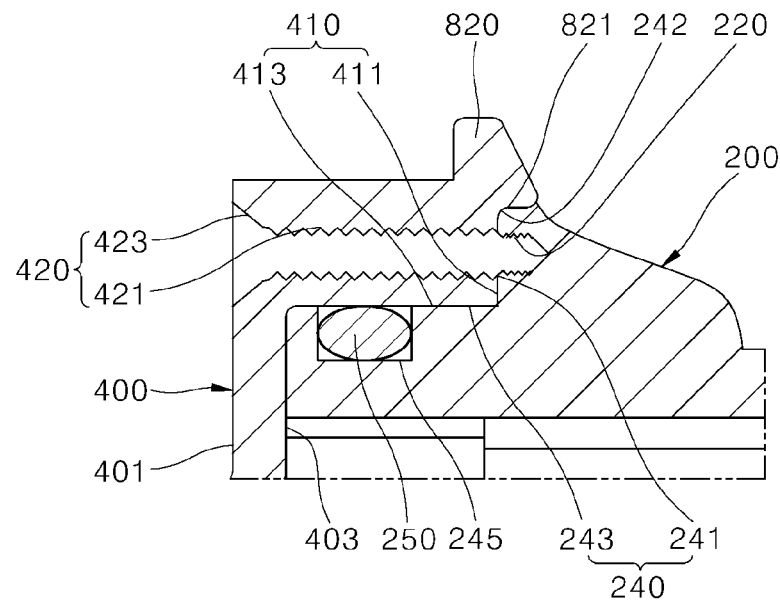
FIG. 12 is an enlarged cross-sectional view showing a state in which the rim and the cover are coupled in the in-wheel motor according to an embodiment of the present invention.

FIGS. 10 and 11 are cross-sectional views showing states before and after coupling of a rim and a cover in the in-wheel motor according to an embodiment of the present invention. Also, FIG. 12 is an enlarged cross-sectional view of a region in which the rim and the cover are coupled.

The in-wheel motor 1000 according to an embodiment of the present invention has a rim-cover waterproof structure.

The rim-cover waterproof structure is formed by the rim 200 and the cover 400, the first and second tire separation preventing bumps 810 and 820, and the bolt fastening portions 420 and 220 formed at the second tire separation preventing bump 820.

Also, the O-ring 250 may be further provided between the rim 200 and the cover 400.

A plurality of configurations such as the shaft 110, the motor assembly 300, which includes the stator 310 and the rotor 330, and the first and second bearings 510 and 520 are embedded in the inner space of the rim 200.

Particularly, various electronic parts such as wires configured to supply power to the stator 310 and the Hall sensor substrate 600 (see FIG. 2) may be embedded in the inner space of the rim 200.

Therefore, securing the waterproof structure is necessary for the inner space of the rim 200.

Also, the rim 200 does not have a structure in which, after a body of the rim 200 is manufactured to be divided into a plurality of pieces, the overall outer shape of the rim 200 is formed by assembly of the plurality of pieces.

Conventionally, some structures have been introduced in which, after a body of the rim 200 is manufactured to be divided in half, the overall outer shape of the rim 200 is formed by assembly of the two pieces. However, the rim 200 of the in-wheel motor 100 according to an embodiment of the present invention is provided in an integrated structure having a single body.

According to such structural characteristics, the structural rigidity of the rim 200 may be improved. Thus, stability of the in-wheel motor 1000 may be improved, and durability thereof may be enhanced.

The cover 400 is coupled to a side surface of the rim 200 and seals the inner space of the rim 200.

Specifically, the cover 400 includes a cover body 401 and an edge protrusion 410.

The cover body 401 is a circular member corresponding to the rim 200 and refers to a body portion that covers the side surface of the rim 200.

The edge protrusion 410 refers to a portion protruding from a circular edge of the cover body 401 toward the rim 200. The edge protrusion 410 is coupled in close contact with a step 240 (see FIG. 12) of the rim 200.

The first tire separation preventing bump 810 is formed to integrally protrude from one side of the rim 200. Also, the second tire separation preventing bump 820 is integrally formed with the cover 400 that is coupled to the other side of the rim 200.

Specifically, the first tire separation preventing bump 810 protrudes to a predetermined height to have a shape whose outer diameter is expanded at the one side of the rim 200.

The second tire separation preventing bump 820 is formed at the edge protrusion 410 of the cover 400. The second tire separation preventing bump 820 intersects a protruding direction of the edge protrusion 410 and protrudes in a direction in which the outer diameter of the cover 400 expands.

The first tire separation preventing bump 810 is formed at the rim 200, and the second tire separation preventing bump 820 is formed at the cover 400, but the size and shape of the first tire separation preventing bump 810 and the second tire separation preventing bump 820 may be the same.

The bolt fastening portions 420 and 220 are formed to fasten the cover 400 and the rim 200.

The bolt fastening portions 420 and 220 are portions to which the fastening bolt 480 (see FIG. 13) is screw-coupled. The bolt fastening portions 420 and 220 structurally fasten the cover 400 and the rim 200. Accordingly, the waterproof structure for the inner portion of the rim 200 may be secured.

Figure 13:
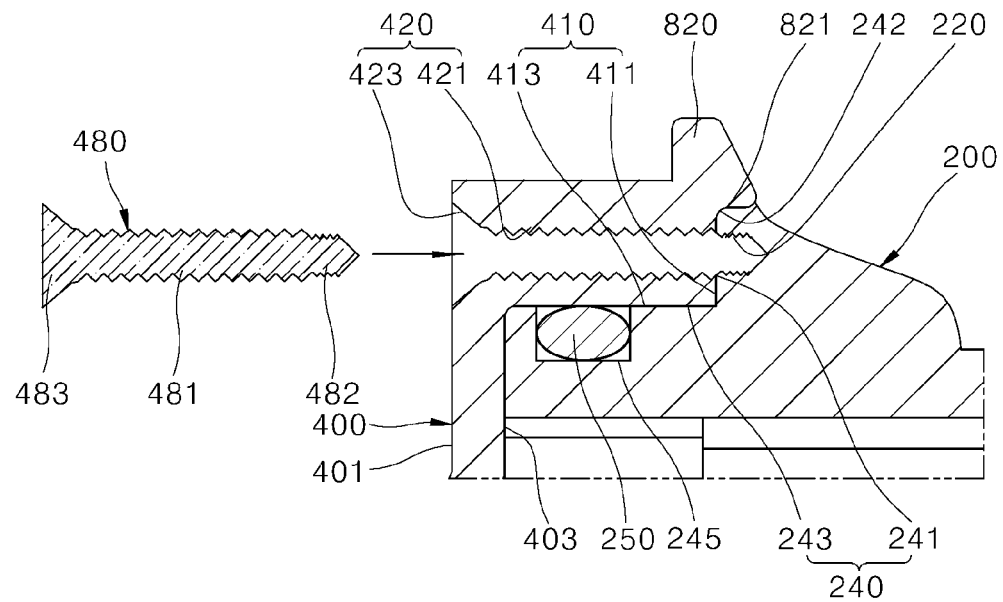
FIG. 13 is an enlarged cross-sectional view showing a fastening bolt that is fastened through a coupling portion between the rim and the cover in the in-wheel motor according to an embodiment of the present invention.

FIG. 13 is an enlarged cross-sectional view showing a fastening bolt that is fastened through the bolt fastening portions 420 and 220.

As illustrated, after the cover 400 is connected to come in close contact with the rim 200, the fastening bolt 480 is inserted and fastened through the bolt fastening portions 420 and 220.

The bolt fastening portions 420 and 220 are formed using the protruding shape of the second tire separation preventing bump 820. Accordingly, a fastening space for fastening the fastening bolt 480 may be secured without increasing the overall diameter of the in-wheel motor.

The bolt fastening portions 420 and 220 include a first bolt fastening portion 420 and a second bolt fastening portion 220.

The first bolt fastening portion 420 is formed at an inner side of the edge protrusion 410 in a direction in which the edge protrusion 410 protrudes. Also, the second bolt fastening portion 220 is formed at the rim 200 so as to face the front of the first bolt fastening portion 420. The second bolt fastening portion 220 is formed to be concentric with the first bolt fastening portion 420 and extend parallel to the first bolt fastening portion 420 in a longitudinal direction thereof.

Both the first and second bolt fastening portions 420 and 220 may be in the shape of a screw hole (that is, a female screw) to be screw-coupled to the fastening bolt 480 and have the size and shape corresponding to each body portion of the fastening bolt 480.

The fastening bolt 480 is sequentially fastened to the first bolt fastening portion 420 and the second bolt fastening portion 220.

Particularly, because the first bolt fastening portion 420, to which the fastening bolt 480 is fastened first, is formed at the cover 400 at which the second tire separation preventing bump 820 is provided, securing additional space for the bolt fastening portions is not required for securing the waterproof structure. Therefore, there is no need to increase the size of the diameter of the in-wheel motor.

The fastening bolt 480 includes a bolt head 483, a first bolt body 481, and a second bolt body 482.

The first bolt body 481 may protrude by a predetermined length from the center of the bolt head 483 and have screw threads corresponding to the first bolt fastening portion 420.

The second bolt body 482 is a portion that extends and protrudes in the longitudinal direction from a front end of the first bolt body 481 and may have screw threads corresponding to the second bolt fastening portion 220.

The bolt head 483 has a structure in which, in a state in which fastening of the fastening bolt 480 is completed, the bolt head 483 is inserted into an inclined hole 423 disposed behind the first bolt fastening portion 420 and is in close contact with the inner portion of the inclined hole 423.

Also, the first bolt body 481 is firmly fixed primarily to a screw hole 421 of the first bolt fastening portion 420, and the second bolt body 482 is firmly fixed secondarily to the second bolt fastening portion 220.

Meanwhile, the second bolt fastening portion 220 may have a smaller diameter than the screw hole 421 of the first bolt fastening portion 420.

For example, the second bolt fastening portion 220 may have a diameter that is reduced by a factor of 0.5 to 0.9 as compared to a diameter of the screw hole 421 of the first bolt fastening portion 420.

When the factor is less than 0.5, a fastening strength may be weakened, and it may be difficult to maintain a firmly coupled state. Conversely, when the factor exceeds 0.9, there is a disadvantage in that it is required to secure a large space at the other side of the rim 200.

Also, the second bolt fastening portion 220 may have a shorter length than the screw hole 421 of the first bolt fastening portion 420. Accordingly, a length of the first bolt body 481 may be formed longer than a length of the second bolt body 482.

Also, the edge protrusion 410 and the step 240 of the rim may have a structure that allows the edge protrusion 410 and the step 240 of the rim to come in close contact so that a gap is not formed therebetween.

For example, a front end portion 411 of the edge protrusion 410 may come in close contact with a wall surface portion 241 of the step 240 of the rim 200, and an internal diameter portion 413 of the edge protrusion 410 may have a structure that comes in close contact with an external diameter portion 243 of the step 240 of the rim 200.

A close contact force between the edge protrusion 410 and the step 240 of the rim may be further reinforced by a fastening force of the fastening bolt 480.

Also, at least one O-ring 250 is provided between the internal diameter portion 413 of the edge protrusion 410 and the external diameter portion 243 of the step 240 of the rim.

The O-ring 250 is disposed between the cover 400 and the rim 200 and prevents moisture from entering therebetween. In this way, waterproof performance between the rim 200 and the cover 400 may be improved.

The O-ring 250 may be accommodated in the external diameter portion 243 of the step 240 of the rim. A groove configured to accommodate the O-ring 250 (hereinafter referred to as "O-ring accommodating portion 245") may be further provided in the external diameter portion 250 of the step 240 of the rim.

The O-ring accommodating portion 245 may be in the shape of a rectangular groove in which a horizontal length is longer than a vertical height.

Specifically, the vertical height of the O-ring accommodating portion 245 may be formed smaller than a diameter of an initial shape of the O-ring 250 (that is, a shape of the O-ring 250 before an external force is applied thereto). Also, the horizontal length of the O-ring accommodating portion 245 may be formed larger than the diameter of the initial shape of the O-ring 250.

Accordingly, before assembly between the cover 400 and the rim 200 (see FIG. 10), an upper end portion of the O-ring 250 disposed in the O-ring accommodating portion 245 protrudes higher than an upper portion of the O-ring accommodating portion 245.

Then, when the cover 400 and the rim 200 are coupled to each other, the upper end portion of the O-ring 250 is pressed downward due to the close contact force between the edge protrusion 410 and the step 240 of the rim.

As a result, after the assembly between the cover 400 and the rim 200 (see FIG. 11), the O-ring 250 is deformed to have an elliptical cross-section that is elongated so that a horizontal width is significantly larger than a vertical height.

The deformed O-ring 250 is accommodated in the O-ring accommodating portion 245 and exhibits a waterproof function.

Meanwhile, referring to FIGS. 12 and 13, a bent groove 821 is formed at an edge of the front end portion 411 of the edge protrusion 410. Also, an outer boundary protruding portion 242, which has a shape corresponding to the bent groove 821, protrudes from an edge of the wall surface portion 241 of the step 240 of the rim.

Boundary surfaces of the bent groove 821 and the outer boundary protruding portion 242 that come in close contact with each other may form an L-shape.

In this way, because the boundary surfaces between the bent groove 821 and the outer boundary protruding portion 242 are bent, external moisture may be further suppressed from entering the inner space of the rim 200 as compared to when the boundary surfaces have a simple straight shape and face each other. Accordingly, the waterproof function may be improved.

As described above, according to the present invention, it is possible to secure a waterproof structure at an entry/exit portion for a power supply lead-out wire of an in-wheel motor. Particularly, as compared to the conventional case in which a sealing task is performed using silicone or the like, it is possible to improve reliability of waterproof performance because the in-wheel motor is formed of a structure robust to vibration and impact. Further, a waterproof structure at a higher level can be secured at a lower cost as compared with the conventional case in which a waterproof structure is secured using an expensive waterproof part, e.g., a cable gland.

Further, according to the present invention, it is possible to secure a high-performance waterproof structure by a worker performing a simple assembly task and a bolt fastening task without structurally expanding a hollow portion of a shaft through which a lead-out wire enters and exits or changing the shape of the hollow portion of the shaft to another complex shape.

Furthermore, according to the present invention, it is possible to secure a waterproof structure at an entry/exit portion for a lead-out wire and secure a waterproof structure relating to an inner portion of a rim in which a plurality of electronic parts, including a motor assembly, are embedded. Therefore, the overall waterproof performance of the in-wheel motor can be significantly improved.

According to the present invention, it is possible to secure a waterproof structure at an entry/exit portion for a power supply lead-out wire of an in-wheel motor.

Particularly, as compared to the conventional case in which a sealing task is performed using silicone or the like, it is possible to improve reliability of waterproof performance because the in-wheel motor is formed of a structure robust to vibration and impact.

Also, because a waterproof structure at an equivalent level can be secured at a lower cost as compared with the conventional case in which a waterproof structure is secured using an expensive waterproof part, e.g., a cable gland, it is possible to improve product competitiveness.

Also, according to the present invention, it is possible to secure a high-performance waterproof structure by a worker performing a simple assembly task and a bolt fastening task without structurally expanding a hollow portion of a shaft through which a power supply lead-out wire enters and exits or changing the shape of the hollow portion of the shaft to another complex shape.

Also, according to the present invention, it is possible to secure a waterproof structure at a portion where a power supply lead-out wire enters and exits through the hollow portion of the shaft and secure a waterproof structure relating to an inner portion of a rim in which a plurality of parts, including a motor assembly, are embedded.

Accordingly, it is possible to reinforce a waterproof function for a plurality of parts including a stator, a rotor, a Hall sensor, a circuit board and the like which are disposed in the inner portion of the rim.

Also, according to the present invention, it is possible to secure a waterproof structure for an inner portion of a rim without an increase or change in a diameter of an in-wheel motor, which is used as a moving means, because increasing a diameter of the rim is not necessary.

Accordingly, it is possible to provide an in-wheel motor of a compact size because it is not necessary to increase a size of a diameter of a wheel, which is an important issue in the in-wheel motor that is mostly used in a portable moving device.

Also, according to the present invention, the structural rigidity of a rim itself can be improved while improving waterproof performance of the in-wheel motor, and convenience in a tire replacement task can be improved.

For example, instead of dividing a body of the rim in half, a first tire separation preventing bump is formed at one side of the rim, and a second tire separation preventing bump is formed at a cover coupled to the other side of the rim. Further, a fastening portion, to which a bolt is fastened, and an O-ring are installed at the second tire separation preventing bump. Accordingly, it is possible to secure the waterproof structure for the inner portion of the rim without increasing the size of the diameter of the in-wheel motor.

Also, just by a task of separating the cover coupled to the other side of the rim, the second tire separation preventing bump, which is formed at the cover unlike the first tire separation preventing bump formed at the one side of the rim, is easily separated. In this way, because a task of removing or mounting a tire can be facilitated just by the task of separating the cover, the convenience in the tire replacement task can be improved.

Also, because, a body of a rim is formed of an integrated structure unlike a conventional rim structure in which a plurality of pieces of the rim are separately manufactured and then coupled by assembling, structural rigidity of the rim can be improved. Accordingly, it is possible to improve durability and product reliability of the in-wheel motor.

Specific advantageous effects of the present invention in addition to the above-described effects have been described above in describing details for practicing the present invention.

The present invention has been described by referring to the embodiments illustrated in the accompanying drawings, but the above description is merely illustrative, and those of ordinary skill in the art to which the present invention pertains should understand that various modifications and other equivalent embodiments are possible from the above embodiments. Therefore, the actual technical scope of the present invention should be defined by the claims below.

What is claimed is:

1. An in-wheel motor comprising:
a circular rim to which a tire is capable of being wrapped around and coupled to an outer ring thereof and including a center through which a shaft passes through thereof to connect to the rim;
a motor assembly which is disposed in an inner portion of the rim and includes a stator connectable to the shaft and a rotor disposed to surround the stator and be rotatable;
a cover coupled to cover one open side surface of the rim and to seal the inner portion of the rim; and
a lead-out wire entry/exit portion waterproof structure to seal an entry/exit portion for a lead-out wire connected to supply power from outside of the in-wheel motor to the inner portion of the rim via a hollow portion of the shaft,
wherein the lead-out wire entry/exit portion waterproof structure includes an elastic stopper, to which the lead-out wire is connected to pass through a center thereof and which elastically contracts after being inserted into the hollow portion of the shaft in an axial direction and seal between the hollow portion of the shaft and the lead-out wire, and a stopper fixing body that fastens to the shaft and presses the elastic stopper in the axial direction so that the elastic stopper is inserted and fixed inside the hollow portion of the shaft,
wherein the elastic stopper has conical shape whose diameter gradually increases from one end portion, which is inserted into the hollow portion of the shaft first, toward an other end portion, which is subsequently inserted into the hollow portion of the shaft, and a conical surface is formed around a circumference of the elastic stopper.

2. The in-wheel motor of claim 1, wherein the hollow portion of the shaft includes a hollow expansion surface in which, at the entry/exit portion for the lead-out wire, an internal diameter portion of the hollow portion of the shaft gradually expands from an inserted position of the one end portion of the elastic stopper toward an inserted position of the other end portion of the elastic stopper.

3. The in-wheel motor of claim 2, wherein the elastic stopper is formed so that, when the elastic stopper is elastically contracted, a diameter of the one end portion has a size corresponding to a size of the smallest internal diameter among sizes of internal diameters of the hollow expansion surface, and a diameter of the other end portion has a size corresponding to a size of the largest internal diameter among the sizes of the internal diameters of the hollow expansion surface.

4. The in-wheel motor of claim 3, wherein the lead-out wire is connected to pass through an internal diameter portion of the elastic stopper, and, when the elastic stopper is elastically contracted, the internal diameter portion of the elastic stopper has an internal diameter whose size corresponds to a size of a diameter of the lead-out wire.

5. The in-wheel motor of claim 1, wherein the stopper fixing body includes a central hole through which the lead-out wire is connected by passing through a center thereof, and the central hole is formed larger than a diameter of the lead-out wire.

6. The in-wheel motor of claim 5, wherein the stopper fixing body is in a shape of a circular plate and is fastened using a plurality of fastening screws so as to face a distal end portion of the shaft and press the elastic stopper.

7. The in-wheel motor of claim 6, wherein the fastening screws are fastened to a plurality of screw holes formed at an edge of the stopper fixing body and a plurality of screw grooves are formed at the distal end portion of the shaft corresponding to the plurality of screw holes.

8. The in-wheel motor of claim 5, wherein the stopper fixing body includes:
a first body portion which is in the shape of a circular plate and is configured to press the elastic stopper; and
a second body portion which protrudes in a shape of a circular tube along an edge of the first body portion and has a female screw portion that screw-couples to a male screw portion formed at a distal end portion of the shaft.

9. An in-wheel motor comprising:
a circular rim to which a tire is capable of being wrapped around and coupled to an outer ring thereof and including a center through which a shaft passes through thereof to connect to the rim;
a motor assembly which is disposed in an inner portion of the rim and includes a stator connectable to the shaft and a rotor disposed to surround the stator and to be rotatable;
a cover coupled to cover an open side surface of the rim and to seal the inner portion of the rim;
a pair of tire separation preventing bumps including a first tire separation preventing bump that protrudes from one side of the rim and a second tire separation preventing bump that protrudes from the cover coupled to an other side of the rim;
a rim-cover waterproof structure that is provided using a protruding shape of the second tire separation preventing bump, which includes at least a portion of a bolt fastening portion to fasten the cover to the rim, and to seal between the cover and the rim; and
a lead-out wire entry/exit portion waterproof structure to seal an entry/exit portion for a lead-out wire connected to supply power from outside of the in-wheel motor to the inner portion of the rim via a hollow portion of the shaft,
wherein the lead-out wire entry/exit portion waterproof structure includes an elastic stopper, to which the lead-out wire is connected to pass through a center thereof and which elastically contracts after being inserted into the hollow portion of the shaft in an axial direction and seal between the hollow portion of the shaft and the lead-out wire, and a stopper fixing body that fastens to the shaft and presses the elastic stopper in the axial direction so that the elastic stopper is inserted and fixed inside the hollow portion of the shaft,
wherein the elastic stopper has conical shape whose diameter gradually increases from one end portion, which is inserted into the hollow portion of the shaft first, toward an other end portion, which is subsequently inserted into the hollow portion of the shaft, and a conical surface is formed around a circumference of the elastic stopper.

10. The in-wheel motor of claim 9, wherein the cover includes:
a circular cover body that corresponds to the other side of the rim; and
an edge protrusion that protrudes from an edge of the cover body toward the rim and is coupled in close contact with a step of the rim.

11. The in-wheel motor of claim 10, wherein the second tire separation preventing bump is formed to protrude from a protruding front portion of the edge protrusion.

12. The in-wheel motor of claim 10, wherein the bolt fastening portion includes:
a first bolt fastening portion formed in the protruding direction of the edge protrusion at an inner side of the edge protrusion; and
a second bolt fastening portion formed to face a front portion of the first bolt fastening portion and extend parallel to the first bolt fastening portion from the other side of the rim.

13. The in-wheel motor of claim 12, wherein:
the first bolt fastening portion and the second bolt fastening portion are sequentially fastened by a fastening bolt; and
the fastening bolt includes a bolt head, a first bolt body protruding from a center of the bolt head, and a second bolt body extending and protruding from the first bolt body.

14. The in-wheel motor of claim 13, wherein:
the bolt head is inserted into an inclined hole disposed behind the first bolt fastening portion when fastening of the fastening bolt is completed;
the first bolt body is fastened to the first bolt fastening portion while passing through a screw hole of the first bolt fastening portion; and
the second bolt body is inserted into and fastened to the second bolt fastening portion.

15. The in-wheel motor of claim 14, wherein:
the second bolt fastening portion has a smaller diameter than the screw hole of the first bolt fastening portion; and
the second bolt fastening portion has a shorter length than the screw hole of the first bolt fastening portion.

16. The in-wheel motor of claim 10, wherein:
a front end portion of the edge protrusion comes in close contact with a wall surface portion of the step of the rim;
an internal diameter portion of the edge protrusion comes in close contact with an external diameter portion of the step of the rim; and
at least one O-ring is provided between the internal diameter portion of the edge protrusion and the external diameter portion of the step of the rim.

17. The in-wheel motor of claim 16, wherein an O-ring accommodating portion, which is in the shape of a groove having a size capable of accommodating the O-ring, is further provided at the external diameter portion of the step of the rim.

18. The in-wheel motor of claim 17, wherein:
a bent groove is formed at an edge of a front end portion of an edge protrusion; and
an outer boundary protruding portion that has a shape corresponding to the bent groove and comes in close contact with the bent groove is formed at an edge of the wall surface portion of the step of the rim.

* * * * *